United States Patent
Lüdi et al.

(10) Patent No.: US 7,012,198 B2
(45) Date of Patent: Mar. 14, 2006

(54) BALANCE WITH A T-SHAPED COUPLING ARRANGEMENT THAT GUIDES THE SUPPORT ELEMENT ONTO A LOAD RECEIVER AT THREE POINTS FORMING A TRIANGLE

(75) Inventors: Beat Lüdi, Wetzikon (CH); Eduard Fringeli, Bubikon (CH); Paul Lüchinger, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/405,825

(22) Filed: Apr. 2, 2003

(65) Prior Publication Data

US 2003/0188897 A1 Oct. 9, 2003

(30) Foreign Application Priority Data

Apr. 3, 2002 (DE) .......................... 102 14 755

(51) Int. Cl.
*G01G 21/23* (2006.01)

(52) U.S. Cl. ...................... 177/50; 177/187; 177/212; 177/210 EM; 177/253; 177/262; 177/DIG. 9; 73/1.13

(58) Field of Classification Search ............... 73/1.13, 73/1.15; 177/50, 187–189, 253, 262, DIG. 9, 177/212, 210 EM
See application file for complete search history.

(56) References Cited

U.S. PATENT DOCUMENTS

| | | | | | |
|---|---|---|---|---|---|
| 4,566,548 A | * | 1/1986 | Sodler et al. | ................ | 177/229 |
| 4,766,965 A | * | 8/1988 | Luchinger | ..................... | 177/50 |
| 4,938,301 A | * | 7/1990 | Stadler et al. | .............. | 177/212 |
| 5,096,007 A | * | 3/1992 | Burkhard | ..................... | 177/187 |
| 5,721,398 A | * | 2/1998 | Balsen et al. | ............... | 177/184 |
| 6,557,391 B1 | * | 5/2003 | Luchinger | .................. | 73/1.13 |
| 6,835,901 B1 | * | 12/2004 | Luchinger | .................. | 177/253 |

\* cited by examiner

*Primary Examiner*—Randy W. Gibson
(74) *Attorney, Agent, or Firm*—Friedrich Kueffner

(57) ABSTRACT

A balance includes a weighing cell with a vertically movable load receiver, a weighing pan to receive a weighing load, and a support element to couple the weighing pan to the vertically movable load receiver of the weighing cell. A cantilever arm with a seat for at least one calibration weight is solidly connected to the support element. The balance has a coupling arrangement that constrains the support element with low-friction mobility to the load receiver at three points forming a triangle in a plane that extends orthogonal to the symmetry plane of the weighing cell, wherein the triangle is symmetric to the symmetry plane of the weighing cell. Under the coupling arrangement, the support element is solidly supported on the load receiver in the direction in which the weighing load is acting.

22 Claims, 7 Drawing Sheets

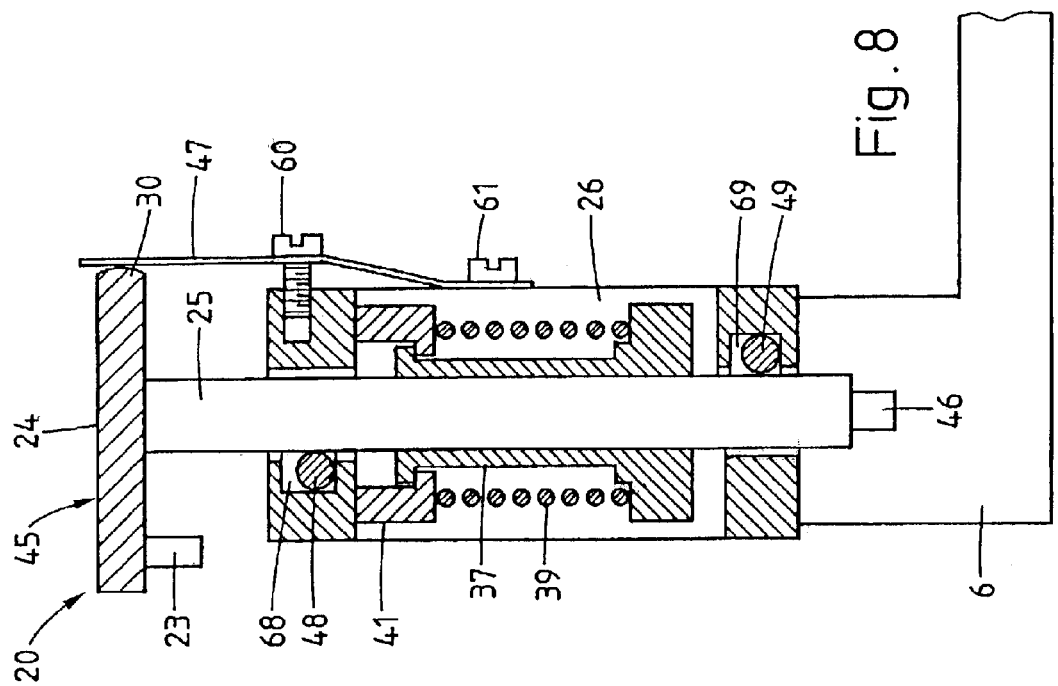
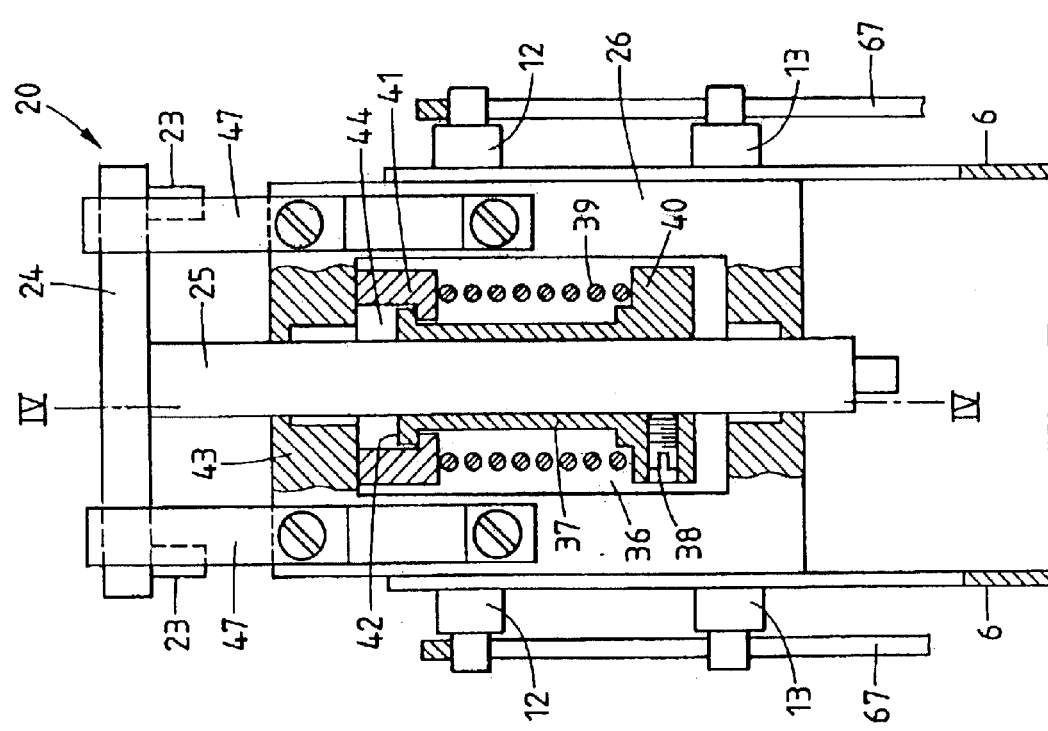

BALANCE WITH A T-SHAPED COUPLING ARRANGEMENT THAT GUIDES THE SUPPORT ELEMENT ONTO A LOAD RECEIVER AT THREE POINTS FORMING A TRIANGLE

BACKGROUND OF THE INVENTION

The invention relates to a balance with a weighing cell including a vertically movable load receiver, with a weighing pan to receive the weighing load, and with a support element to couple the weighing pan to the vertically movable load receiver of the weighing cell, wherein a cantilever support with a seat for at least one calibration weight of a calibration device is solidly connected to the support element.

Balances in which a cantilever element is connected to the weighing cell and in which a weighing pan and/or a calibration device is arranged at the opposite end of the cantilever from the connection to the weighing cell belong to the known state of the art. Balances of this kind are prone to the risk that the forces acting on the cantilever element may cause a deformation of the vertically movable load receiver which, in turn, may introduce harmful torques into the weighing cell, specifically into the sensitive flexure pivots of the weighing cell. This danger is present in particular when a load is placed at an off-center position on the weighing pan. In the terminology of weighing instruments, the balance has an unfavorable cornerload behavior.

A balance is disclosed in DE 33 30 988 A1, where the cantilever element receiving the weighing pan is configured L-shaped. The weighing pan is solidly connected to and supported by the free end of the horizontal leg of the L. The vertical part of the L is connected to the weighing cell by way of a U-shaped arrangement of support arms. The two horizontal pairs of arms embrace the vertically movable load receiver of the weighing cell at upper and lower locations in the planes of the parallelogram guides of the weighing cell. The arrangement of support arms is attached to the load-introduction part of the weighing cell at two support locations that are disposed vertically above each other, at the upper location with a screw connection and at the lower location by a type of attachment that allows rotation about a vertical axis within the range of elastic twisting of the arrangement of support arms. This configuration offers the possibility of a horizontal as well as vertical position adjustment of the weighing pan. Due to the fact that the force introduction occurs in the plane of the guide members, it was possible to reduce the cornerload sensitivity of the balance with this design arrangement. As a part of an overload safety device against excessive loads, a leaf spring is installed between a horizontal tilt axle that is connected to the vertical L-part of the cantilever element and the vertical section of the U-shaped support-arm arrangement, with the free ends of the leaf spring being elastically biased against the support-arm arrangement. In the normal load range, the leaf spring behaves as a quasi-rigid abutment. In the overload range, it allows the horizontal arm of the L-shaped cantilever element to yield flexibly within a limited range.

While the U-shaped support-arm arrangement described in DE 33 30 988 A1 is elastic with regard to twisting, it still has a fixed connection to the weighing cell through the screws. This creates the danger that deformations of the U-shaped support-arm arrangement are still introduced, albeit in attenuated form, directly into the load-receiving area of the weighing cell where they have an effect on the flexure joints. Furthermore, the force that triggers the overload safety device is position-dependent. This means that the nearer the point of force application is to the support-arm arrangement, the stronger the force has to be to release the overload safety device. Furthermore, the balance disclosed in DE-33 30 988 A1 offers no solution for the protection of the sensitive flexure pivots of the weighing cell against excessive vertical forces applied in the reverse direction to the force caused by a weighing load. Forces of this kind can occur, e.g., if the balance is abruptly put upside down during transportation of the balance in its shipping container such that the balance is standing on its head, so to speak, especially if the balance is exposed to an abrupt deceleration in the process.

OBJECT OF THE INVENTION

The present invention has the objective to provide a coupling arrangement for a balance that is equipped with a cantilever element supporting a calibration device and/or a weighing pan, to couple the weighing cell to the cantilever and/or to the weighing pan. The coupling device should prevent residual torques from reaching the weighing cell as it easily yields in all directions.

SUMMARY OF THE INVENTION

According to the invention, the foregoing objective is met by a balance with a weighing cell including a vertically movable load receiver, with a weighing pan to receive the weighing load, and with a support element to couple the weighing pan to the vertically movable load receiver of the weighing cell, wherein a cantilever support with a seat for at least one calibration weight of a calibration device is solidly connected to the support element. The balance has a coupling arrangement wherein the support element is constrained to the load receiver at three points forming an isosceles triangle in a plane that is orthogonal to the symmetry plane of the weighing cell. The constraint works in such a manner that the load receiver firmly holds the support element in the direction of the load application while allowing the support element to move in all other directions relative to the load receiver without an appreciable amount of friction.

The low-friction constraint of the support element to the load receiver at defined points ensures that the forces generated by a load on the weighing pan or by the at least one calibration weight are introduced into the weighing system, i.e., into the load receiver of the weighing cell, largely without extraneous interference while the support element has at the same time a high degree of mobility. All extraneous forces are absorbed without play by the arrangement, leaving a clearly defined force to act on the weighing cell.

The coupling arrangement, i.e., the arrangement to couple the support element to the load receiver of the weighing cell, has the particularly advantageous distinction that the guiding constraint of the support element on the load receiver is realized with rolling elements to reduce friction, in particular with rolling balls.

This leads to the end result of a balance with a high reproducibility and high resolution, or in other words, the invention allows the full performance potential of a high-resolution weighing cell to be utilized.

As the support element has the mobility to yield in particular to forces acting in the opposite direction of a weighing load, there will be no damaging effect on the weighing cell when the balance is positioned upside down in transport, because in this case the movable support element will decouple itself from the weighing cell with regard to the transmission of forces.

In a balance where the weighing pan is not connected to the far end of the same cantilever that holds a calibration device, but where the weighing pan is instead releasably coupled to the support element, in particular hooked onto the support element, there is a particular advantage if the support element has unrestrained mobility in the opposite direction to the weighing load, i.e., in the upward direction in a balance that is set up for operation. This is in view of the risk that with careless handling of the weighing pan when putting it on or off the support element, an upward force may be applied to the support element, in which case it is important to prevent that the upward force reaches the load receiver of the weighing cell and destroys the sensitive flexure joints. The risk of an upward force reaching the load receiver is successfully avoided in the inventive balance, because the movable support element decouples itself from the weighing cell, so that no force is transmitted. In particular, there is an end stop arranged at a fixed position relative to the housing, which will absorb excessive upward-directed forces.

In a particularly advantageous embodiment of the balance according to the invention, an overload safety device is integrated in the support element for protection from excessive downward-directed forces acting on the weighing pan. Sideways-directed extraneous forces are likewise absorbed by the housing in a way that causes no harm to the system.

The support element is distinguished by the fact that it is configured as an assembly unit and can be installed on as well as separated from the load receiver of the weighing cell without any implements such as tools. This enhances in particular the serviceability of the inventive balance because, in contrast to state-of-the-art balances, there are no screws that have to be loosened on the sensitive part of the weighing cell.

Through the support element, the weighing pan is thermally decoupled from the weighing cell. At the same time, the weighing pan is in electrically conductive contact with the support element, so that the weighing pan is connected to ground and electrostatic charges can thus be drained off in a defined manner.

The support element in a preferred embodiment consists of a coupling element and a base element, with the base element being movable relative to the coupling element nearly without friction. The coupling element has a T-shaped configuration with a vertical column and a transverse horizontal part. Within the support element, the movable constraint of the base element relative to the coupling element can be implemented with rolling elements, particularly roller balls. This has the advantage that the support element can be given a compact design. With the extremely low friction in the constraints, the force that releases the overload safety in case of an overload acting on the cantilever is location-independent, i.e. independent of where the force is applied to the cantilever.

In a particularly preferred further developed embodiment of the inventive balance, the weighing pan rests on the support element at three points forming an isosceles triangle in a plane that is orthogonal to the symmetry plane of the weighing cell, with the triangle being arranged symmetrically relative to the symmetry plane. It is particularly advantageous if the support element includes a rocker element that can swivel horizontally about the vertical axis and forms a yielding constraint for a weighing pan that is suspended on the support element.

In particularly advantageous embodiments of the inventive balance, the floor of the weighing compartment has no openings of any kind. This makes the weighing compartment significantly more convenient to clean.

BRIEF DESCRIPTION OF THE DRAWINGS

A detailed description of the invention is presented below on the basis of exemplary embodiments of a balance according to the invention, specifically of a support element according to the invention, as illustrated in the drawings which represent simplified schematic views of the invention and wherein:

FIG. 7 represents the entire support element as seen in the direction of the arrow A of FIG. 1, with the middle portion shown in a partially cut-away view, FIG. 8 represents a sectional view along the line IV—IV of FIG. 7.

DETAILED DESCRIPTION OF PREFERRED EMBODIMENTS

Figure 1:
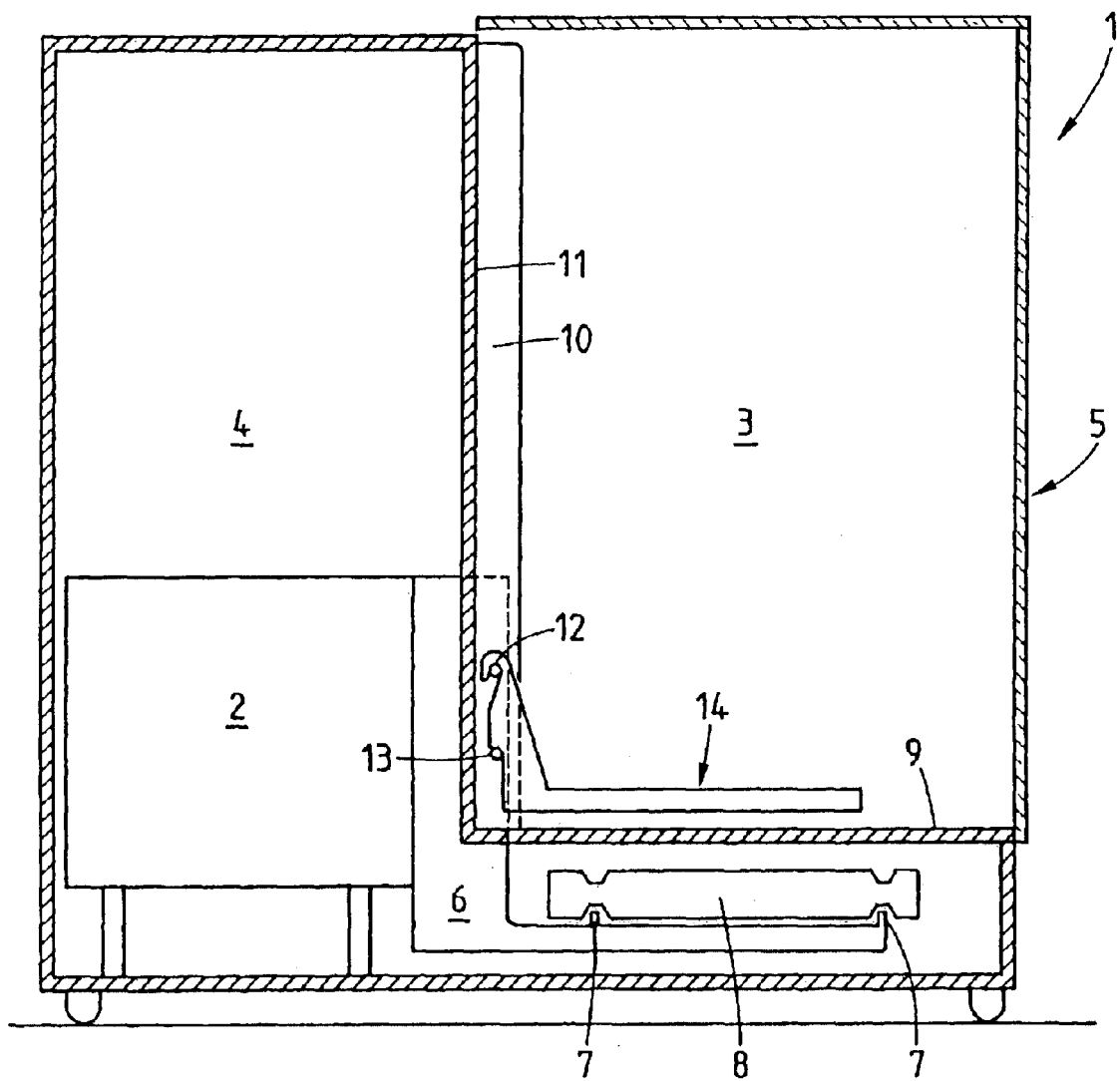
FIG. 1 represents a side view of the balance.

FIG. 1 gives a side view of the balance 1 with the balance housing 4 and a weighing compartment 3 enclosed by the draft shield 5. The part of the balance housing 4 shown in the left-hand portion of the drawing contains the weighing cell 2, which is not shown in detail. An L-shaped cantilever 6 with a calibration device is connected to the weighing cell 2 to introduce the weighing force into the weighing cell 2. The lower portion of the cantilever 6 has a seat 7 for at least one calibration weight 8. The calibration device is arranged in a compartment of the balance housing 4 that is closed off on top by the floor 9 of the weighing compartment 3. The vertical part of the L-shaped cantilever 6 has suspension bolts 12 protruding through lateral passage openings in a projecting channel 10 of the rear wall 11 of the weighing compartment 3, as well as support bolts 13. A weighing pan 14 can be hooked onto the suspension bolts 12 and seated firmly against the support bolts 13. The weighing pan 14 can serve as a base for a variety of implements for different applications, e.g., for dishes, laboratory vessels, other containers for materials to be weighed, or for the materials themselves. The weighing compartment 3 of a balance 1 of this kind is particularly easy to clean.

Figure 2:
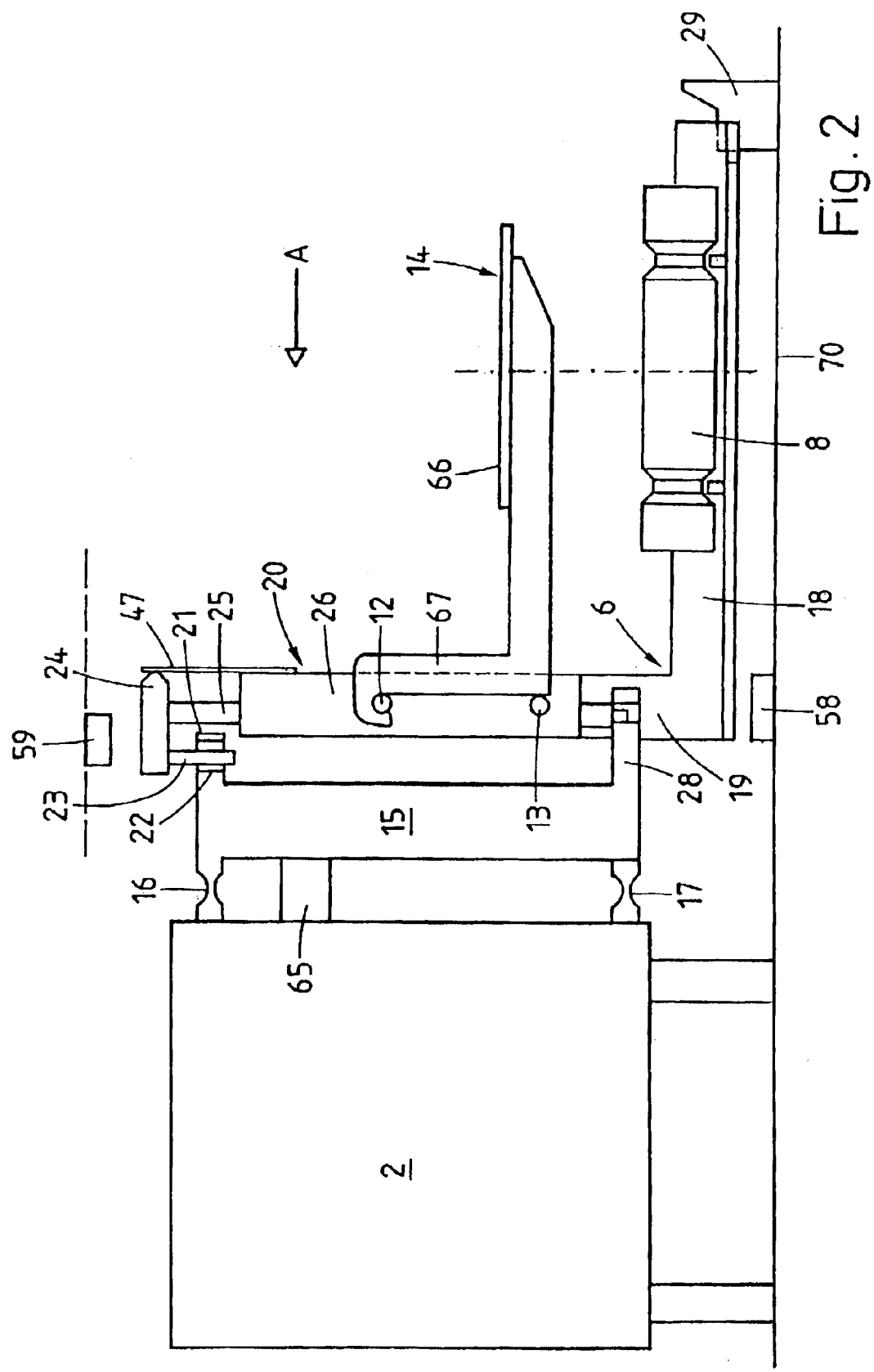
FIG. 2 represents a side view of a weighing cell, a support element with a cantilever arm, and a weighing pan carrier attached to the cantilever arm in a balance according to the invention.

FIG. 2 shows a side view of the balance 1 with the balance housing 4 and draft shield 5 removed. As in FIG. 1, the weighing cell 2 is represented only schematically. The only details of the weighing cell that are shown are the flexure pivots 16 and 17 next to the vertically movable load receiver 15. The flexure pivots 16 and 17 may belong, e.g., to a weighing cell based on the principle of electromagnetic force compensation.

According to the known state of the art, this kind of weighing cell has a parallelogram linkage connecting the vertically movable load receiver 15 to the stationary part of the weighing cell 2 through upper flexure pivots 16 and lower flexure pivots 17. The lever system of the weighing cell 2 is schematically indicated by the connection 65 joining the vertically movable load receiver 15. The L-shaped cantilever 6 is connected to the weighing cell 2 as an input element for the weighing force. The horizontal portion 18 of the L-shaped cantilever 6 carries the calibration device with at least one calibration weigh 8. The lateral mobility of the horizontal part 18 of the L-shaped cantilever 6 is limited in both directions. The lateral limit stop is configured as a nose 29 arranged on the housing floor 70. The outer end of the horizontal part 18 of the L-shaped cantilever 6 is shaped like a fork with two tines flanking the nose 29. The vertical part 19 of the L-shaped cantilever 6 is solidly attached to a support element 20, e.g., by means of screws.

Figure 9:
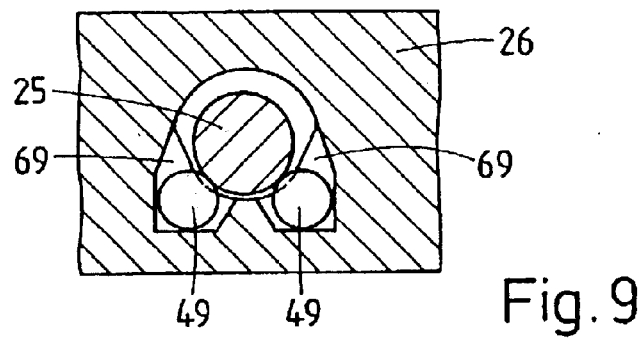
FIG. 9 represents a detail of the base element and the vertical column in a cross-section perpendicular to the vertical column.

The support element 20 is coupled to the upper and lower ends of the load receiver 15, preferably at about the same respective heights as the upper and lower flexure pivots 16, 17 of the parallelogram linkage of the weighing cell 2. For the upper part of the coupling arrangement, the load receiver 15 has an upper projection 21 with two horizontally spaced-apart openings 22, each of which is engaged by a retaining peg 23 of the support element 20 (only one opening 22 and one peg 23 can be seen in the side view of the drawing). The retaining pegs, which are likewise spaced apart, are solidly connected to a horizontal member 24 of the support element 20. The middle of the horizontal member 24 is solidly connected to the upper end of a vertical column 25, so that the horizontal member 24 and the vertical column 25 form a T-shaped coupling element. The support element 20 further includes a base element 26 that is traversed by the vertical column 25 and is vertically movable as will be explained below in the context of FIGS. 7 to 9. The lower end of the vertical column 25 is supported by a lower projection 28 of the load receiver 15.

The weighing pan is composed of two L-shaped support arms 67 and the shelf plate 66. The support element 20 has two lateral suspension bolts 12 for the suspension of the weighing pan 14. The housing of a balance according to the invention is configured so that the suspension bolts 12 as well as the support bolts 13 protrude into the weighing compartment 3 through passage openings in the sides of a projection 10 of the rear wall 11. At least a part of the support element 20 extends inside the projecting channel 10 of the rear wall 11 (see FIG. 1).

As a preferred arrangement, the mass center of the calibration weights 8 is located vertically below the area center of gravity of the shelf plate 66 of the weighing pan 14, as indicated by the dash-dotted vertical line in FIG. 2.

The housing floor 70, indicated by a horizontal line in FIG. 2, has an end stop 58 which is part of an overload safety device to provide protection in case excessive loads are placed on the weighing pan 14. FIG. 2 also shows an end stop 59 which limits the amount of displacement of the support element 20 in case of upward-directed forces. The end stop 59 is likewise in a fixed spatial relationship to the housing, as symbolically indicated by a broken line in FIG. 2.

Figure 3:
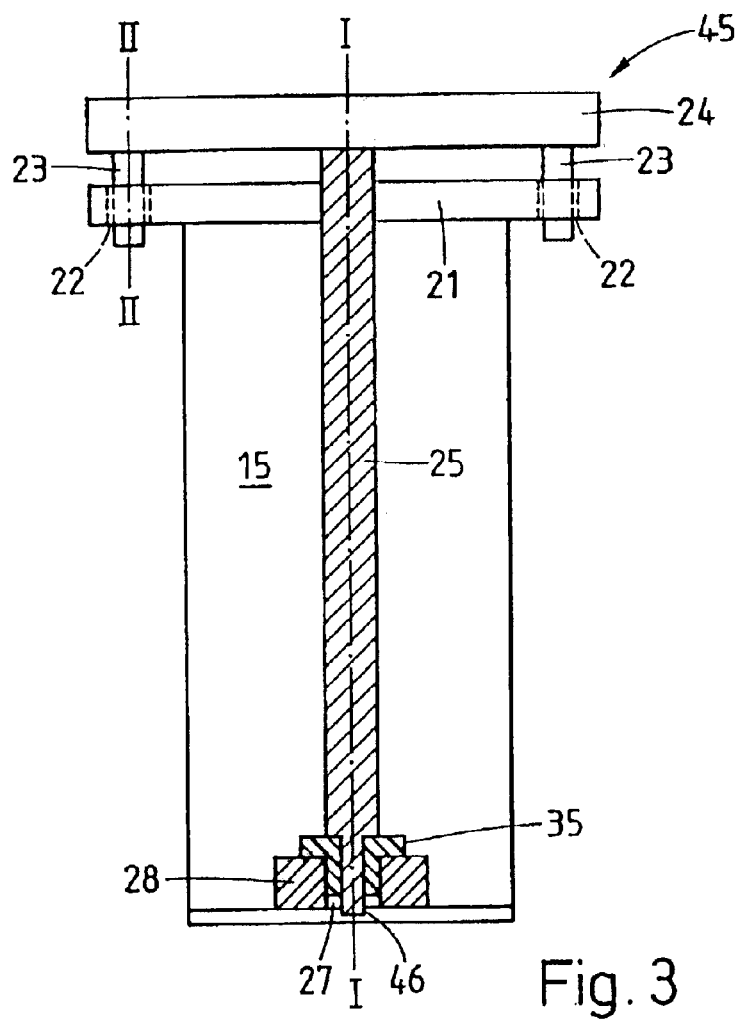
FIG. 3 represents a coupling element supported in a suspended position from the upper projection of the load receiver, shown in a sectional view in a plane that is perpendicular to the arrow A of FIG. 2.

FIG. 3 illustrates the T-shaped coupling element 45 set in place in its engaged position on the upper projection 21 of the load receiver 15, as seen in the direction of the arrow A in FIG. 2. (The base element 26 of the support element 20 has been omitted from this drawing for the sake of clarity.) The vertical column 25 as well as the lower projection 28 of the load receiver 15 are shown in sectional view. The dash-dotted line I—I indicates the plane of symmetry in relation to which the weighing cell 2 as well as the entire support element 20 and further elements of the weighing system are arranged in mirror-symmetry and which extends perpendicular to the drawing plane of FIG. 3. The horizontal member 24, which is solidly connected to the vertical column 25, extends perpendicularly to both sides of the vertical column 25 and of the symmetry plane of the weighing cell. The retaining pegs 23 are attached to the outer ends of the horizontal member 24. They are engaged in the openings 22 of the upper projection 21 of the load receiver 15, not fastened but firmly seated in defined positions. As seen in FIG. 3, the upper projection 21 of the load receiver 15 is wider than the main portion of the load receiver 15 (see also FIGS. 4, 5 and 6a).

At the lower end of the T-shaped coupling element 45, the diameter of the vertical column 25 is stepped down to form a pin 46. The pin 46 is inserted in a bearing element 35 which is preferably made of an electrically conductive plastic material with a high electrical resistance. The bearing element 35 is seated in a bore hole 27 in the lower projection 28 of the load receiver 15. Consequently, the supporting contact of the coupling element 45 and thus of the entire support element 20 with the load receiver 15 occurs at three points. There is no fixed connection between the load receiver 15 and the support element 20, as the support element 20 is only guided by and seated on the load receiver 15.

Figure 4:
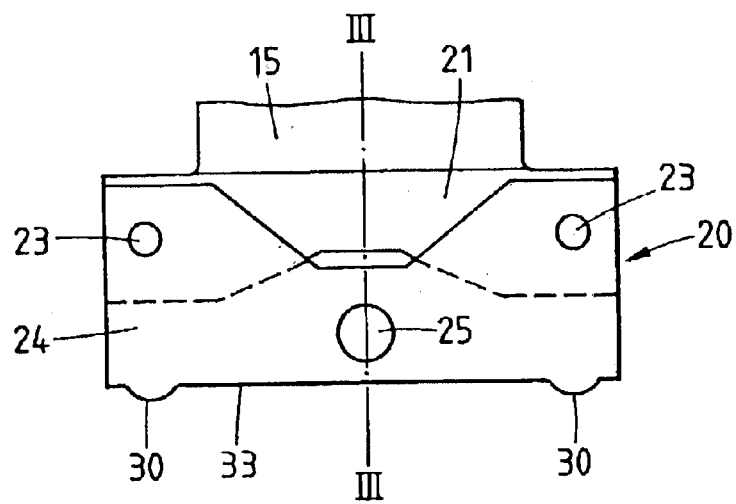
FIG. 4 shows the load receiver with the support element set in place, as seen from above.

FIG. 4 gives a top view of the load receiver 15 with the support element 20 seated in place. The dash-dotted line III—III again indicates the symmetry plane of the weighing cell, analogous to the dash-dotted line I—I in FIG. 3. The shape of the horizontal member 24 can be seen here with particular clarity. Of particular importance are the two protuberances 30 at the front side 33 of the horizontal member 24, i.e., on the side which in the installed condition faces towards the weighing pan, as will be explained in detail below in the context of FIG. 8. The two protuberances 30 are at the same distance from the symmetry plane of the weighing cell as the two retaining pegs 23. Each protuberance 30 cooperates with a leaf spring 47 (see FIG. 2) in an adjusting arrangement for the support element 20 with the cantilever 6 and the weighing pan 14.

Figure 5:
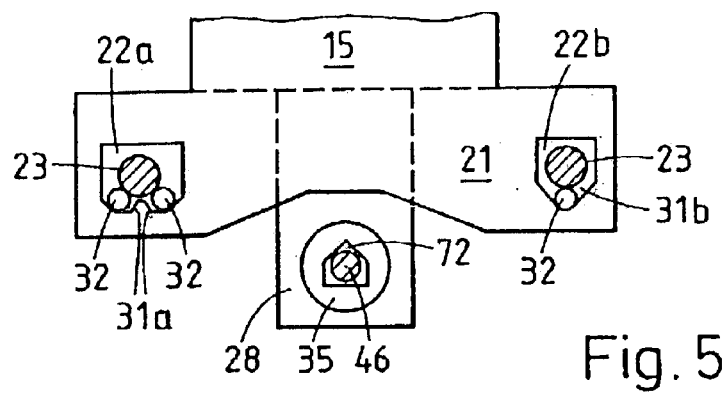
FIG. 5 represents a top view of the load receiver without the support element.

FIG. 5 shows the load receiver as seen from the top. Of particular interest are the support locations arranged in the upper projection 21 of the load receiver 15 for the coupling element 45 of the support element 20. The openings 22a and 22b, in which the retaining pegs 23 are shown for the sake of clarity, are designed with a special configuration. The opening 22a is rectangular and relatively wide in comparison to the peg 23. On one side of the opening 22a, there are two recesses 31a. A ball 32 of an electrically insulating material such as glass or ceramic is seated in each of the recesses and is held in place by a cage (not shown in the drawing). The opening 22b has one recess 31b to accommodate one ball of insulating material, likewise held in place by a cage. A suitable cage can for example be configured simply as a sleeve of thin sheet metal folded around the upper projection 21 in the area of an opening 22a, 22b. The sleeve has openings in the areas of the recess 31a, 31b that are slightly smaller than the openings of the projection 21, so that the insulating balls 32 are held captive in their positions. The retaining pegs 23 are constrained by point contact with each of the balls 32, meaning that each ball 32 touches a peg only at one point, so that the retaining pegs 23 are thermally and electrically insulated from the load receiver 15.

The cages allow the balls 32 enough mobility to perform a rolling motion. A downward vertical movement of the retaining pegs 23 caused by a deformation of the T-shaped coupling element 45 is absorbed by a rolling movement of the balls 32 with a minimum of friction, so that the forces generating the deformation cannot be transmitted to the load receiver 15.

The seat for the coupling element 45, more specifically for the vertical column 25, in the center of the lower projection 28 consists of the bore hole 27 and the bearing element 35, as mentioned above. The bearing element 35 is preferably made of a polymer material or ceramic material that is electrically conductive but has a high resistance. Thus, the coupling element 45 and a weighing pan 14 attached to the support element 20 are connected to ground with a well-defined amount of conductivity, so that electrostatic charges generated on the weighing pan can be drained off. The electrical resistance may be varied depending on the selection of the conductive plastic or ceramic material. The bearing element 35 further provides thermal decoupling of the entire support element 20 from the load receiver 15. The bearing element 35 has a passage hole 72 that is engaged by the pin 46 of the vertical column 25 (shown in FIG. 5 for clarity). The passage hole 72 has a V-shaped cutout on the side facing towards the weighing cell 2, so that the pin 46 is seated in a clearly defined position and the coupling element is guided by a positive constraint at the lower end, too.

The arrangement for supporting the T-shaped coupling element 45 and thus the entire support element 20 on the load receiver 15 provides a defined way of positioning, so that the support element 20 can yield sideways but always falls back into its original position. By allowing the support element to yield sideways, this arrangement prevents horizontal force components from being transmitted to the load receiver 15 and thus also provides protection from unintended force-related effects.

Figure 6A:
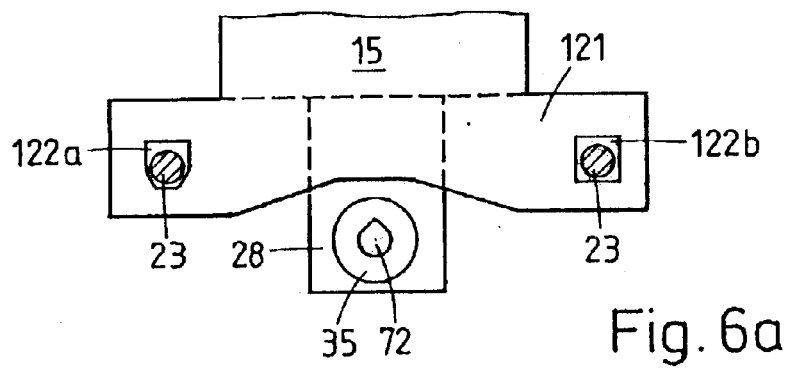
FIG. 6a represents a simple embodiment of the load receiver without the support element in a top view.
Figure 6B:
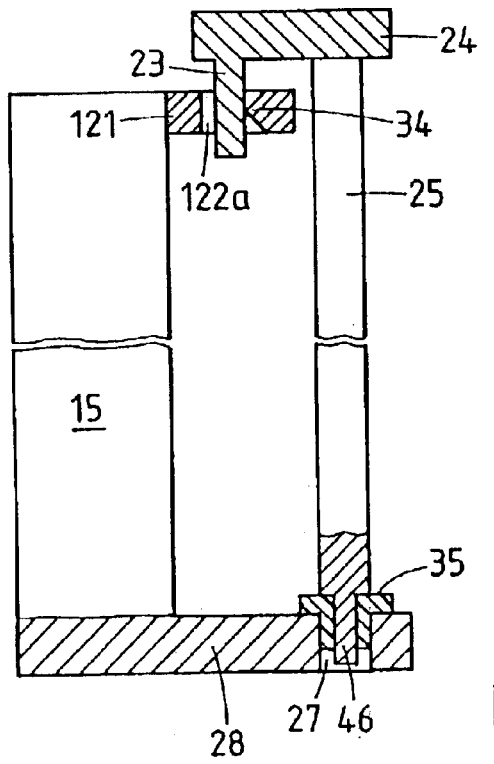
FIG. 6b represents the load receiver of FIG. 6a including the coupling element, with the upper part sectioned along the line II—II and the lower part sectioned along the line I—I of FIG. 3.

Different variations are possible for the design of the support constraints for the T-shaped coupling element 45 on the load receiver 15. The FIGS. 6a and 6b illustrate a simple embodiment which shows the concept for the support arrangement of the coupling element 45 on the vertically movable load receiver 15 of the weighing cell 2 with particular clarity. FIG. 6a is analogous to FIG. 5 in that it shows the load receiver 15 in a top view. FIG. 6b illustrates a lengthwise section through the vertically movable load receiver 15, where the upper part is sectioned in a plane along the line II—II and the lower part in a plane along the line I—I of FIG. 3. The constraint of the retaining pegs 23 in the upper projection 121 of the load receiver 15 occurs through a point contact as the opening 122a has an edge 34 (see FIG. 6b) on the side facing towards the coupling element 45. The opening 122b, which has a square or rectangular shape, can have the same kind of edge. The vertical column 25 is supported on the lower projection 28 with the pin 46 (not shown in FIG. 6a) seated in the bearing element 35 that is inserted in the bore hole 27. The passage hole 72 in the bearing element 35 is substantially round with a V-shaped cutout pointing towards the weighing cell 2 to guide the pin 46 of the vertical column 25.

FIG. 7 shows the entire support element 20 viewed in the direction of the arrow A in FIG. 2. The portion in the middle of the support element is shown partially cut open. The L-shaped cantilever 6 and the arms 67 of the weighing pan 14 are indicated only in a fragmentary manner. The base element 26 of the support element 20 has a break-through space 36 in the middle, with the vertical column 25 passing through the center of the break-through space. The base element 26 is likewise mirror-symmetric relative to the symmetry plane of the weighing cell that is indicated in FIGS. 3 and 4.

The vertical column 25 is guided in the base element 26 with vertical mobility relative to the base element. A sleeve 37 is arranged in the break-through space 36 of the base element 26 and fastened to the vertical column 25 by means of a screw 38. A coil spring 39 pushes at one end against the flange 40 of the sleeve 37 and at the other end against a ring 41 that bears against the upper transverse portion 43 of the base element 26. A defined amount of biasing force is set by compressing the coil spring 39 to a defined length between the flange 40 and the ring 41.

The foregoing arrangement is part of an overload safety system. If an excessive load is placed on the weighing pan 14, the coil spring 39 takes up the excess by yielding elastically, in which case the collar 42 at the upper end of the sleeve can glide vertically in an open space 44 of the ring 41. With this arrangement, excessive forces don't even have an opportunity to reach the load receiver 15. At the same time, the downward vertical mobility causes the cantilever 6 to meet with the end stop 58 on the floor of the housing (see FIG. 2).

Approximately in the middle of its vertical height, the base element 26 has a pair of laterally projecting suspension bolts 12 for the weighing pan 14. The suspension bolts 12 are stepped down to a narrower diameter towards their outer ends. This ensures that a weighing pan 14 is always seated in a centered position on the suspension bolts 12. Similarly configured support bolts 13, arranged at the lower end of the base element 26 in parallel to the suspension bolts 12, are preferred as seating constraints for the weighing pan 14 (see FIGS. 1 and 2). However, a self-adjusting seating arrangement could be used as an alternative solution, as will be described below in the context of FIGS. 10 and 11.

FIG. 8 shows the coupling element 20 in a sectional plane along the line IV—IV of FIG. 7 (It should be noted that the line IV—IV is not in the symmetry plane of the weighing cell). The drawing gives on the one hand a clear impression how the vertical column 25 is vertically guided and on the other hand how the base element 26 with the L-shaped cantilever 6 is supported in a position-restoring arrangement relative to the coupling element 45 that consists of the vertical column 25 and the horizontal member 24. A leaf spring 47 is attached to the mid-portion of the base element 26 by means of a screw 61. The leaf spring, which has an outward-biased pre-tension and is adjustable to a defined position by means of the screw 60, extends beyond the base element 26 and bears against the front side 33 of the horizontal member 24, i.e., the side that faces towards the weighing pan 14. The compressive contact between the leaf spring 47 and the horizontal member 24 occurs at the protuberances 30 that can be seen in FIG. 4. The protuberances 30 can be curved in both the horizontal and vertical direction as can be seen from FIG. 8 in combination with FIG. 4. Thus, the leaf spring 47 is in contact with only one point of the curved surface of the protuberance 30. In case of an overload, the base element 26 can therefore move vertically relative to the vertical column 25 and the horizontal member 24 with almost no friction. The leaf spring arrangement provides at the same time the required position-restoring force after the base element 26 has been rotated sideways relative to the vertical column 25, so that the base element 26 and the connected cantilever 6 return to their original position.

A few millimeters from the upper end of the base element 26, and at another location located a few millimeters from the lower end, the vertical column 25 is guided by pairs of roller balls 48, 49 (with only one ball being visible in the drawing). The ball pairs 48, 49 are located, respectively, in recesses 68, 69 of the base element 26. As shown in the detail drawing FIG. 9 in a sectional plane through the base element 26 in the vicinity of the vertical column 25, the vertical column 25 and the two balls of a pair 48, 49 form a triangle. The balls 49 at the lower location are on the side of the column 25 facing towards the weighing pan, and the balls 48 at the upper location are on the side facing towards the weighing cell 2. The ball pairs 48, 49 have a vertical mobility of about 1 to 2 millimeters in their respective recesses. If the base element 26 moves up or down relative to the vertical column 25, the balls 48, 49 are in rolling contact with the column and the walls of the respective recesses 68, 69. The vertical column can thus move vertically with minimal friction relative to the base element 26, i.e., only with the rolling resistance of the ball pairs 48, 49. Because the forces originating from the cantilever and acting on the vertical column are always putting the ball pairs 48 and 49 under horizontal compression, the ball pairs have no play between the walls of their respective recesses 68, 69 and the vertical column. Thus the relative movement between the coupling element 45 and the base element 26 is guided with positive, play-free contact.

It is important for the vertical column 25 to move easily in the vertical direction to perform its function in cooperation with the coil spring 39 as an overload safety device against excessive downward-directed forces. The support element 20 simultaneously provides protection from excessive upward-directed forces which, if they were transmitted into the weighing cell 2, could likewise cause damage to the sensitive pivots of the weighing cell mechanism. As the support element 20 is only constrained by the retaining pegs 23 at the upper projection 22 of the load receiver 15 and supported on the lower projection 28 through the pin 46 and the bearing element 35, the support element will separate itself from these coupling constraints in case of an upward-directed force, so that there is no longer a force-transmitting connection to the weighing cell 2. The upward movement of the support element 20 will in this case be limited by the upper end stop 59. The two retaining pegs 23 and the pin 46 are designed with a sufficient length so that they will still be constrained by the openings 22, 22a, 22b, 122a, 122b and the hole 27 when the support element 20 is at the upper end stop 59.

Figure 10:
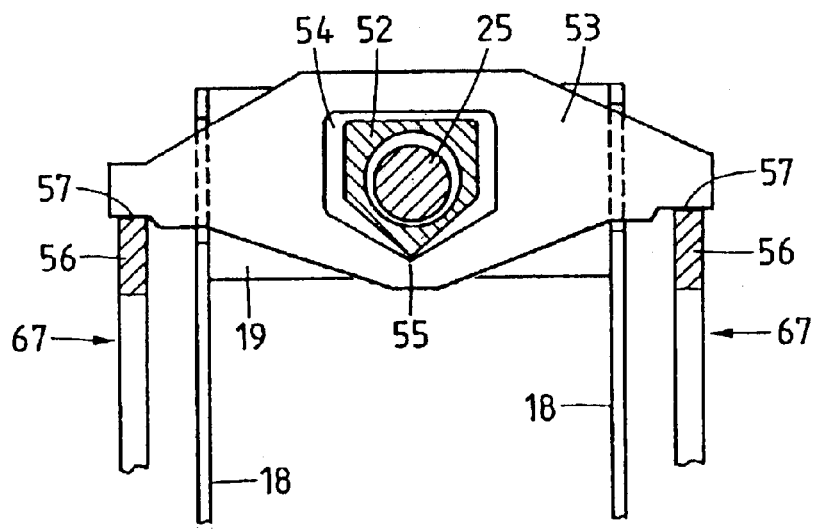
FIG. 10 represents the lower portion of the support element in a sectional view perpendicular to the vertical column.
Figure 11:
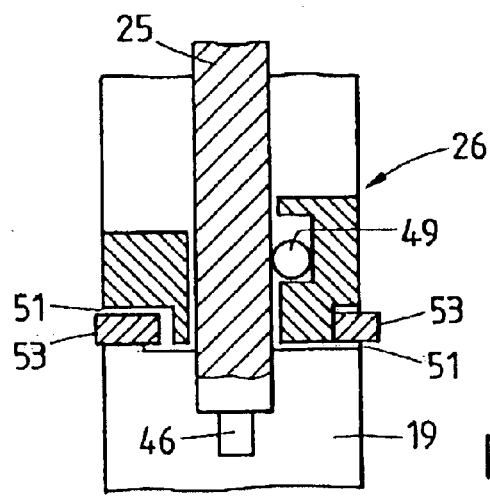
FIG. 11 represents a sectional view of the lower portion of the base element along the vertical column, analogous to FIG. 8.

FIG. 10 shows a further way of configuring the constraint for the weighing pan at the lower end of the base element 26 as seen in a sectional plane perpendicular to the vertical column 25. The vertical column 25 passes through a five-cornered hollow peg 52 that protrudes from the lower end of the base element 26 and is solidly connected to the latter. A transverse rocker element 53 made, e.g., of sheet metal with a likewise five-cornered opening in the middle is seated on the peg 52 so that the rocker element 53 is free to swivel in the plane perpendicular to the vertical column 25 about the contact point 55 between the rocker element 53 and the peg 52. When a weighing pan 14 is set in place, the vertical parts 56 of its support arms 67 bear against the seating portions 57 at the outer ends of the rocker element 53. The rocker element is retained in a slot 51 in the vertical leg 19 of the L-shaped cantilever 6 and thereby prevented from sliding vertically off the peg 52, as may be seen in the sectional detail drawing of the lower portion of the base element in FIG. 11.

Based on the design concept of the rocker element 53, the weighing pan 14 is coupled to the support element 20 through a three-point support analogous to the connection of the support element 20 to the vertically movable load receiver 15 of the weighing cell 2. The triangle formed by the three points is again symmetric relative to the aforementioned symmetry plane of the weighing cell, and the three points lie in a plane that is orthogonal to the symmetry plane.

The rocker element 53 serves to transmit the force from the two support arms 67 of the weighing pan 14 into the base element 26 of the support element 20. The rocker element 53 channels the flow of force so that the sum of the forces acts against the point 55 (see FIG. 10). The rocker element 53 thus absorbs deformations of the weighing pan 14. The distribution of forces acting on the support element 20 is statically defined. In contrast, if the weighing pan 14 is supported at four points as in the embodiment of FIG. 7 with two suspension bolts 12 and two support bolts 13, the distribution of forces on the four points is statically indeterminate.

Figure 12:
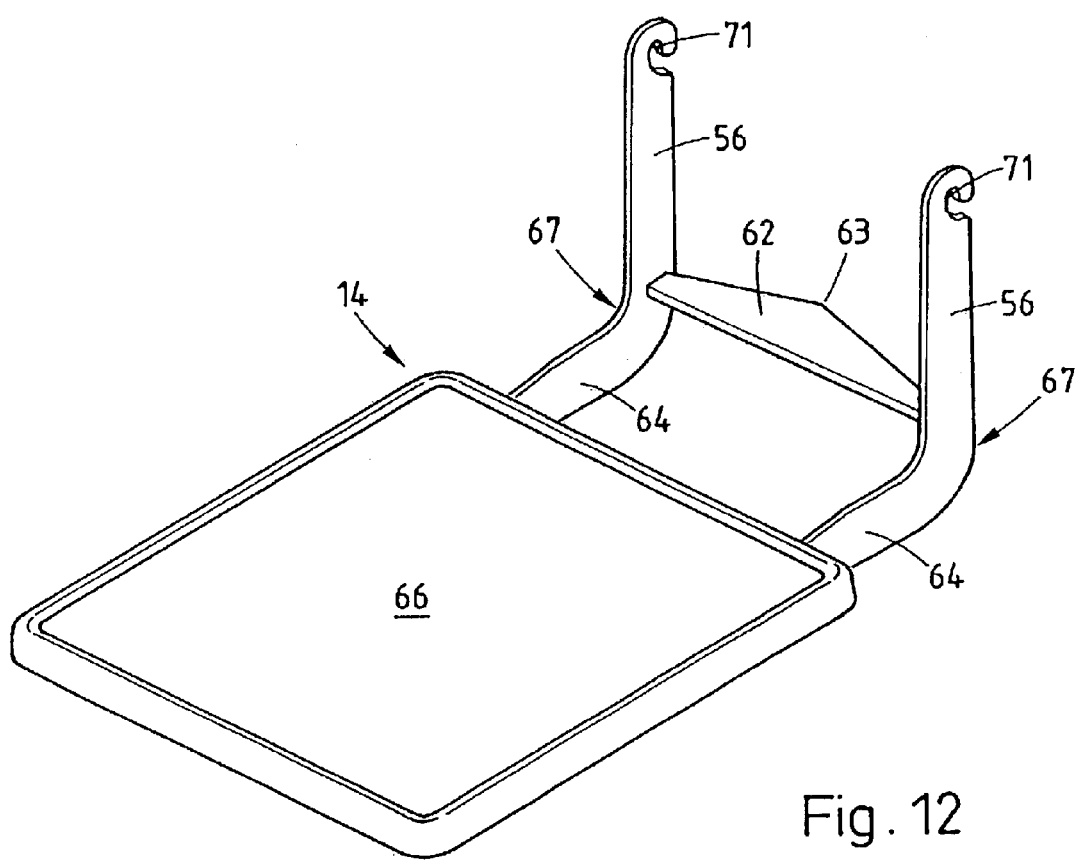
FIG. 12 represents a three-dimensional view of a weighing pan in an embodiment with an integral three-point support.

A three-point support arrangement can also be integrated directly into the weighing pan, as illustrated in FIG. 12. The weighing pan 14 shown here in a three-dimensional view has an approximately triangular transverse support plate 62 connecting the two support arms 67. The triangle corner 63 of the support plate 62 on the side facing away from the weighing pan 14 can be configured as a point contact that bears directly against the base element 26 of the support element 20. The other two support points of the weighing pan 14 are represented by the contact points between the hooks 71 of the support arms 67 and the suspension bolts 12 of the base element 26. In this arrangement, too, the three support points lie in a plane that is orthogonal to the symmetry plane of the weighing cell.

Further embodiments are conceivable for coupling a removable weighing pan to the support element through a three-point support. For example, a weighing pan can be configured with two horizontal support arms to be coupled to the lower portion of the support element and a third support point arranged on a transverse connecting member between the support arms, so that the third support point lies in the symmetry plane of the weighing cell.

Implied herein is the understanding that other configurations, e.g. of the load receiver, of the support element and/or of the weighing pan can be used as constituent parts of a balance according to the invention.

What is claimed is:

1. A balance comprising:
   a weighing cell (2) with a vertically movable load receiver (15), a weighing pan (14) to receive a weighing load, a support element (20) to couple the weighing pan (14) to the load receiver (15), a cantilever arm (6) with a seat (7) for at least one calibration weight (8), said cantilever arm being solidly connected to the support element (20), and a coupling arrangement (22, 22a, 22b, 122a, 122b, 23, 35, 46) for transmitting a force from the support element (20) into the load receiver (15), wherein said coupling arrangement guides the support element (20) with low-friction mobility on the load receiver (15) at a first triplet of points forming a triangle in a plane that extends orthogonal to a symmetry plane of the weighing cell (2), said triangle being symmetric to said symmetry plane, and wherein the coupling arrangement solidly supports the support element (20) on the load receiver (15) in a direction in which the weighing load is acting.

2. The balance according to claim 1, wherein the weighing pan (14) is arranged on the support element (20) so that the weighing pan can be taken off the support element.

3. The balance according to claim 1, further comprising suspension bolts (12) that are arranged laterally on the support element (20), wherein the weighing pan (14) is configured so that it can be hooked onto the suspension bolts (12).

4. The balance according to claim 1, characterized in that the support element (20) is configured as a completely detachable assembly unit which can be installed and uninstalled on the load receiver (15) without any implements.

5. The balance according to claim 1, wherein for supporting and constraining the support element (20) on the vertically movable load receiver (15) of the weighing cell (2), the support element (20) is configured so that it can be hooked onto the load receiver (15) in at least one point.

6. The balance according to claim 1, wherein the support element (20) comprises a T-shaped coupling element (45) and a base element (26) that is vertically movable on the coupling element without play.

7. The balance according to claim 6, wherein the load receiver (15) comprises an upper projection (21) and a lower projection (28), wherein the T-shaped coupling element (45) comprises a vertical column (25) and a horizontal member (24) that is fastened to an upper end of the vertical column (25) and is symmetric relative to a symmetry plane of the weighing cell, wherein the horizontal member (24) has retaining pegs (23) configured for engagement in openings (22, 22a, 22b, 122a, 122b) of the upper projection (21), and wherein the vertical column (25) has a bottom end seated in the lower projection (28).

8. The balance according to claim 7, wherein first rolling elements (32) are arranged in the openings (22, 22a, 22b) of the upper projection (21) to provide low-friction guidance for the retaining pegs (23).

9. The balance according to claim 8, wherein the first rolling elements consist of a thermally insulating material, whereby the support element (20) is thermally decoupled from the load receiver (15).

10. The balance according to claim 7, further comprising a bearing element (35) inserted in a bore hole (27) in the lower projection (28), said bearing element serving to support the vertical column (25).

11. The balance according to claim 10, wherein the bearing element (35) is made of an electrically conductive material with a high electrical resistance.

12. The balance according to claim 1, wherein the weighing cell comprises upper and lower flexure pivots (16, 17) through which the load receiver (15) is connected to a stationary part of the weighing cell (2), and wherein said first triplet of points are arranged at locations that lie in the same respective horizontal planes as the upper and lower flexure pivots (16, 17).

13. The balance according to claims 7, further comprising an overload safety device that is integrated in the support element (20) for protection of the weighing cell from excessive forces acting vertically on at least one of the weighing pan (14) and the cantilever arm (6).

14. The balance according to claim 13, further comprising a pre-tensioned coil spring (39) that is arranged in the support element (20) as a part of the integrated overload safety device for protection from excessive forces acting vertically in the same direction as the weighing load, and also comprising a sleeve (37) that is fastened to the vertical column (25), wherein the coil spring (39) exerts a biasing force against the sleeve (37).

15. The balance according to claim 6, further comprising second rolling elements (48, 49), wherein the T-shaped coupling element (45) is guided with low-friction mobility in the base element (26) through the second rolling elements (48, 49).

16. The balance according to claim 1, further comprising an upper end stop (59) arranged at a fixed location relative to the housing in order to limit a displacement travel of the support element (20) that occurs as a consequence of excessive forces acting in an opposite direction of the weighing load.

17. The balance according to claim 6, further comprising leaf springs (47) arranged on the base element (26) to provide an adjustable constraint for at least one of the cantilever arm (6) and the weighing pan (14).

18. The balance according to claim 7, wherein at least one of the cantilever arm (6) and the weighing pan (14) has the mobility to swivel in a direction orthogonal to the vertical column (25), wherein said mobility is independent of the weighing load and opposed by a defined position-restoring force.

19. The balance according to claim 1, wherein the weighing pan (14) is seated on the support element (20) at a second triplet of points forming an isosceles triangle in a plane that is orthogonal to the symmetry plane of the weighing cell, said triangle being symmetric to said symmetry plane.

20. The balance according to claim 7, wherein the support element (20) comprises a rocker element (53) that is free to swivel horizontally about the vertical column (25), said rocker element serving to seat the balance pan (14) on the support element (20) in a statically defined three-point supporting arrangement.

21. The balance according to claim 1, further comprising a weighing compartment (3) with a weighing compartment floor (9) extending without openings between the cantilever arm (6) and the weighing pan (14).

22. The balance according to claim 1, wherein the weighing cell (2) is an electromagnetic force-compensation cell that operates with a minimum amount of displacement travel.

* * * * *